(12) United States Patent
Dixon et al.

(10) Patent No.: US 12,044,343 B2
(45) Date of Patent: Jul. 23, 2024

(54) MODULAR MULTI-COUPLING DEVICE

(71) Applicant: Dixon Valve & Coupling Company, LLC, Chestertown, MD (US)

(72) Inventors: Jaron Dixon, Gastonia, NC (US); Josh Money, Kings Mountain, NC (US); Bryan Penn, Charlotte, NC (US)

(73) Assignee: DIXON VALVE & COUPLING COMPANY, LLC, Chestertown, MD (US)

( * ) Notice: Subject to any disclaimer, the term of this patent is extended or adjusted under 35 U.S.C. 154(b) by 107 days.

(21) Appl. No.: 17/893,761

(22) Filed: Aug. 23, 2022

(65) Prior Publication Data

US 2024/0068612 A1 Feb. 29, 2024

(51) Int. Cl.
*F16L 37/56* (2006.01)

(52) U.S. Cl.
CPC ........... *F16L 37/56* (2013.01); *F16L 2201/10* (2013.01)

(58) Field of Classification Search
CPC . F16L 37/56; F16L 37/58; F16L 39/00; F16L 2201/00; F16L 2201/10; F16L 2201/80
USPC .............................. 285/26, 29, 81, 82, 124.5
See application file for complete search history.

(56) References Cited

U.S. PATENT DOCUMENTS

| | | | |
|---|---|---|---|
| 3,888,518 A * | 6/1975 | Delessert | F16L 37/56 285/70 |
| 5,316,347 A | 5/1994 | Arosio | |
| 5,507,530 A | 4/1996 | Mahaney | |
| 10,288,198 B2 | 5/2019 | Tiberghien et al. | |
| D868,948 S | 12/2019 | Clifford et al. | |
| 11,079,053 B2 | 8/2021 | Wolf et al. | |
| 2006/0130910 A1 | 6/2006 | Knuthson | |
| 2011/0198840 A1 | 8/2011 | Sorbi et al. | |
| 2019/0154065 A1 | 5/2019 | Tiberghien et al. | |

FOREIGN PATENT DOCUMENTS

| | | |
|---|---|---|
| DE | 102007021514 A1 | 11/2008 |
| EP | 2095002 B1 | 8/2015 |
| EP | 3462071 A1 | 4/2019 |
| EP | 3608578 A1 | 2/2020 |
| WO | 2004/031637 A1 | 4/2004 |
| WO | 2019/099354 A1 | 5/2019 |

OTHER PUBLICATIONS

European Search Report for corresponding European Patent Application No. 23192375, Dec. 14, 2023.

* cited by examiner

*Primary Examiner* — Aaron M Dunwoody
(74) *Attorney, Agent, or Firm* — Howson & Howson LLP

(57) ABSTRACT

A multi-coupling device is provided that includes separate modular first and second device halves that each carry a plurality of fittings or connectors and that are configured to be locked together or separated for purposes of simultaneously connecting or disconnecting the plurality of fittings or connectors of the first device half to or from the plurality of fittings or connectors of the second device half. Each of the device halves is constructed of a plurality of separate module blocks secured together in side-by-side relation. Each module block has at least one retaining plate for securing at least one fitting or connecter thereto, and each of the device halves includes at least one latch block to which the plurality of module blocks of the device half is secured.

18 Claims, 9 Drawing Sheets

MODULAR MULTI-COUPLING DEVICE

BACKGROUND

The present invention relates to a multi-coupling device for use in simultaneously connecting a plurality of lines (hydraulic, pneumatic, electrical, etc.) by means of fittings or connectors.

Examples of known multi-coupling devices are disclosed, for instance, by U.S. Pat. No. 5,316,347 issued to Arosio, U.S. Pat. No. 5,507,530 issued to Mahaney, U.S. Pat. No. 10,288,198 issued to Tiberghien et al., and U.S. Pat. No. 11,079,053 issued to Wolf et al., and in U.S. Design Pat. No. D868,948 issued to Clifford et al., U.S. Patent Application Publication Nos. 2006/0130910 A1 of Knuthson, 2011/0198840 A1 of Sorbi et al., and 2019/0154065 A1 of Tiberghien et al., International Application Publication Nos. WO 2004/031637 A1 of Martin and WO 2019/099354 A1 of Foner, European Patent No. EP 2095002 B1 and European Patent Application Publication No. EP 3608578.

With respect to known multi-coupling devices, if a different combination of quantities and sizes of fittings to be connected simultaneously is required, then a new framework to hold those fittings must be designed, evaluated, and manufactured. This is a lengthy and expensive process that limits part manufacturers to a set number of configurations. Removal of the fittings for service or replacement often requires the use of highly specialized tooling, or even the disconnection of fluid or other lines from the fittings. This can result in environmental contamination from spillage, air inclusion within the system, and unintended releases of stored power.

SUMMARY

According to an embodiment, a quick-coupling, multi-coupling device is provided that includes separate modular first and second device halves that each carry a plurality of fittings or connectors and that are configured to be locked together or separated for purposes of simultaneously connecting or disconnecting the plurality of fittings or connectors of the first device half to or from the plurality of fittings or connectors of the second device half. Each of the modular device halves is constructed of a plurality of separate module blocks secured together in side-by-side relation. Each module block has at least one retaining plate for securing at least one fitting or connecter thereto, and each of the device halves includes at least one latch block. Each of the module blocks within each device half is removable and replaceable with a different module block, a different sized module block, or a different number of module blocks.

DETAILED DESCRIPTION

According to an embodiment, a quick coupling device is provided that facilitates simultaneous connection and disconnection of multiple fittings. In particular, the device can be used to provide new combinations of line quantities and sizes to be configured on demand without the need to design new components. According to an embodiment, the device utilizes fastened retaining plates for rapid installation and removal of fittings within the system.

More particularly, the device utilizes interchangeable module blocks that carry a set of fittings or connectors and that may be bolted together. In addition, retaining plates are secured to each module block to allow for rapid installation/removal of fittings or connectors to each module block. Accordingly, the device allows for interchangeable module blocks to be added or replaced within the system, with minimal added time or cost. The retaining plates associated with this system allow for the rapid installation on and removal from the module blocks of fittings without the need for specialized tooling or the risk of spillage.

According to a first embodiment, a multi-coupling device 10 includes opposite halves that can be brought and locked together to simultaneously connect multiple fittings or the like retained by the halves. Likewise, the device 10 can be unlocked to simultaneously disconnect multiple fittings or the like.

Figure 1:
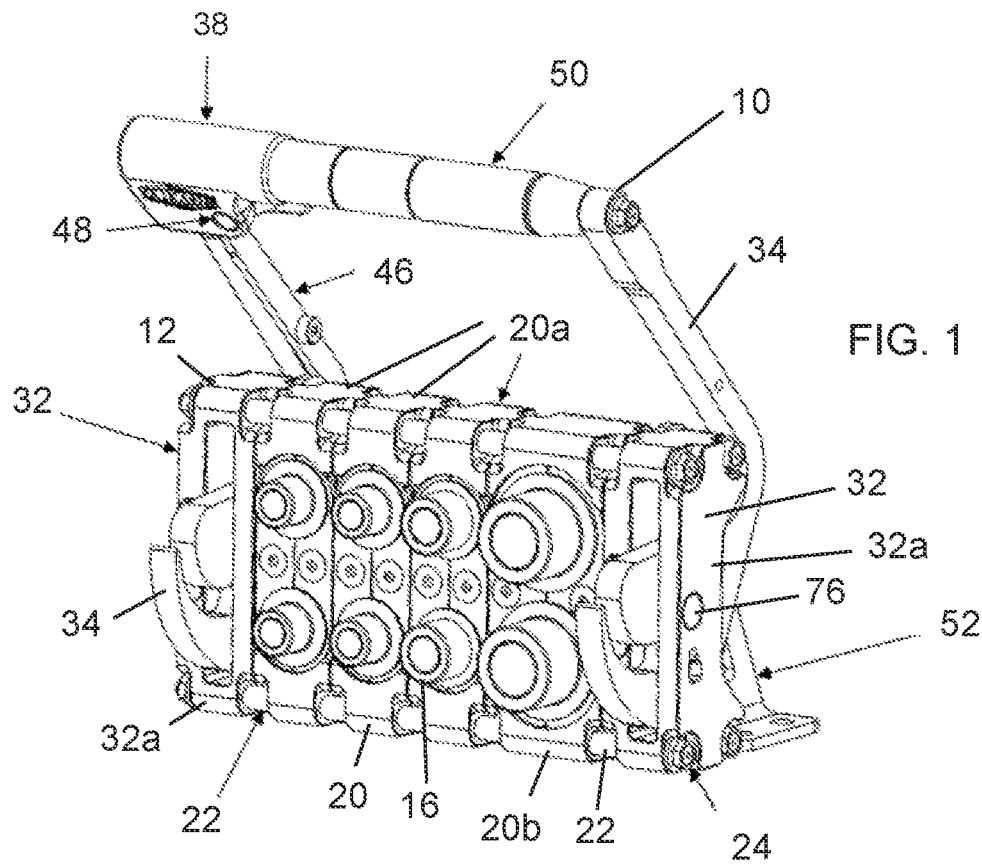
FIG. 1 is a perspective view of a fixed half of a multi-coupling device in accordance with an embodiment.
Figure 2:
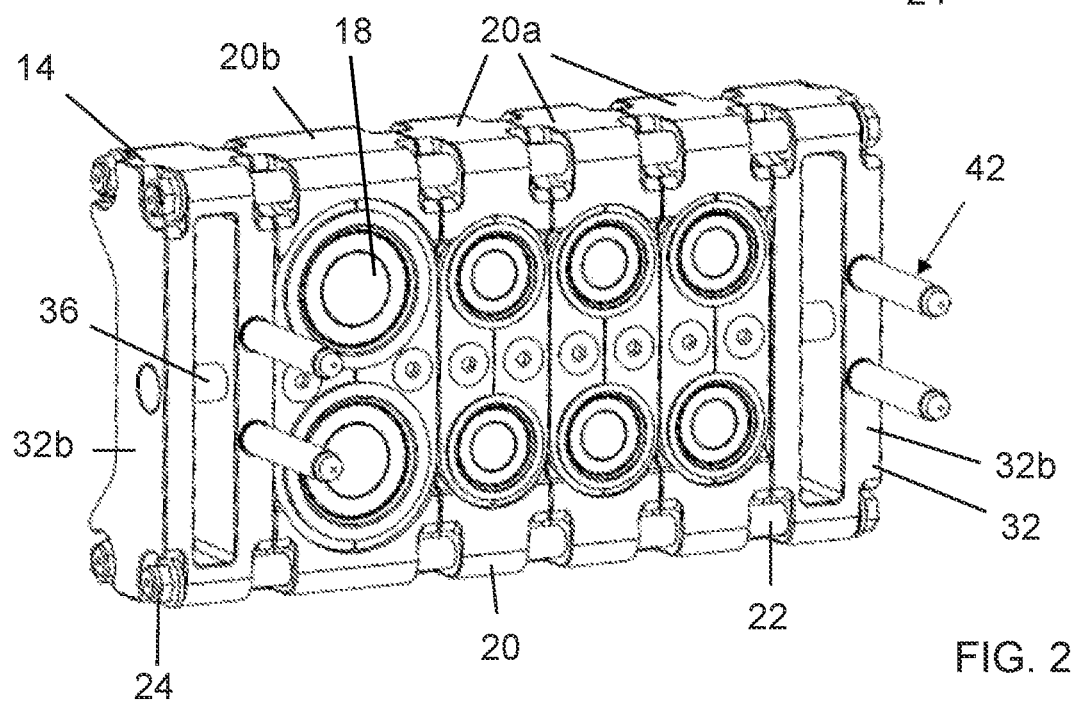
FIG. 2 is a perspective view of a mobile half of a multi-coupling device in accordance with an embodiment.

For example, FIG. 1 illustrates a half 12, which is hereinafter referred to as a fixed half, and FIG. 2 illustrates an opposite half 14, which is hereinafter referred to as a mobile half. The combination provides the device 10.

A first set of fittings 16 of any type, size, and arrangement is mounted to the fixed half 12 and a second set of fittings 18 is mounted to the mobile half 14 in a mirror arrangement such that, in the connected condition of the device 10, the first set of fittings 16 connect to the second set of fittings 18 within the device 10. For instance, the first set of fittings 16 may be male fittings and the second set of fittings may be female fittings. Connection of the fittings, 16 and 18, may enable the transference or storage of a working medium, such as a fluid (hydraulic or pneumatic), energy, or the like.

Each of the halves, 12 and 14, include a plurality of separate module blocks 20 that are stacked (side-by-side) and held or bolted together by a series of shoulder studs 22 and lock nuts 24. In the illustrated embodiment, each half, 12 and 14, includes four shoulder studs 22 each having a pair of lock nuts 24 at opposite ends. The shoulder studs 22 are extended through open channels 86 formed in each module block 20. The lock nuts 24 apply compressive force to secure the module blocks 20 together in a side-by-side relation on the shoulder studs 22.

The module blocks 20 are standardized interchangeable components to which the fittings, 16 and 18, may be mounted. The module blocks 20 may be provided in different sizes (i.e., having different widths), and different sized module blocks 20 and/or a different number of module blocks 20 may be secured together in any arrangement on each of the halves, 12 and 14, depending upon the needs of the particular application. Solely by way of example, and not be way of limitation, in FIG. 1 there are three module blocks 20a of a first size on which different fittings are mounted and one relatively larger module block 20b on which different larger fittings are mounted. This arrangement is repeated in the mobile half 14 shown in FIG. 2 such that like fittings mate when the halves, 12 and 14, are brought together. Any number or arrangement of the module blocks 20 and types or sizes of fittings mounted thereto may be readily reconfigured by inserting the desired types of mobile blocks 20 on the shoulder studs 22 and by locking the arrangement in place with the lock nuts 24.

Figure 12:
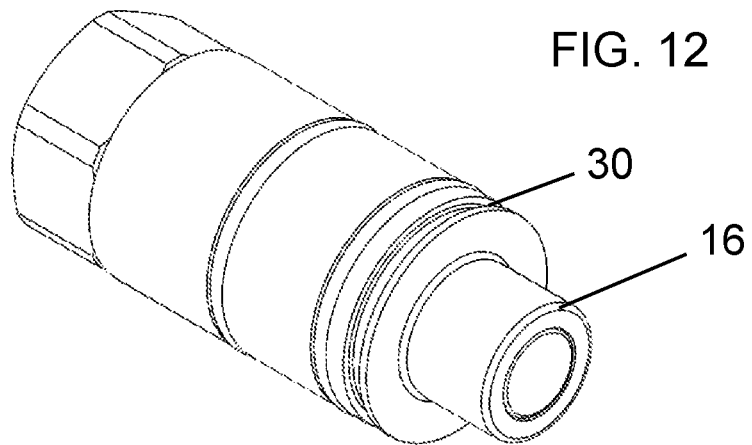
FIG. 12 is a perspective view of a fitting in accordance with an embodiment.

One or more retaining plates 26 are connected to each module block 20 to contain the fittings within the module blocks 20. The retaining plates 26 can be quickly installed or removed from the module blocks 20 with the use of a single tool. The retaining plates 26 interface with a groove 30 located on the fittings (for instance, see the fitting 16 shown in FIG. 12) and are secured to the module blocks 20 with fasteners 28.

Figure 5:
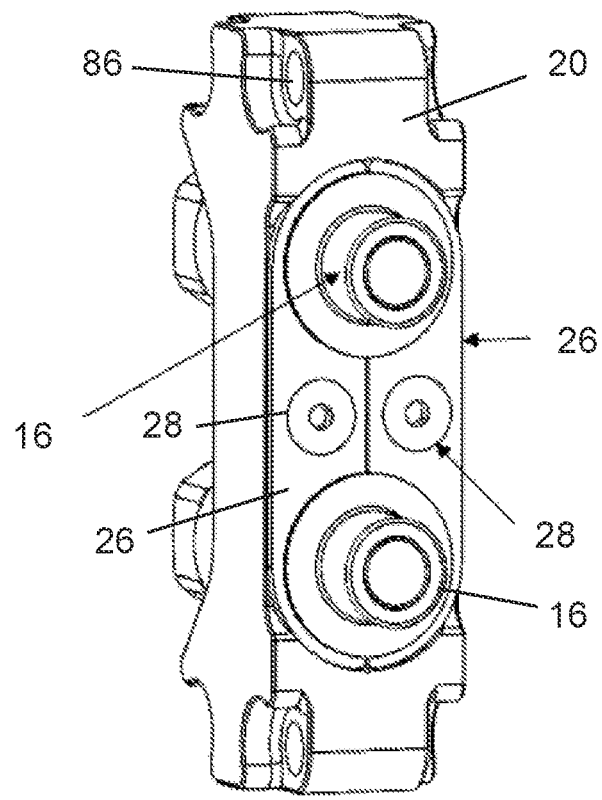
FIG. 5 is a perspective view of a module block for use on both the fixed and mobile halves of FIGS. 1 and 2.

By way of example, the module block 20 shown in FIG. 5 has a pair of retaining plates 26 which are each secured with a fastener 28 to the module block 20. The retaining plates 26 together form an oval-shaped plate having an upper aperture and a lower aperture. Thus, in the illustrated embodiment, there are two fittings 16 mounted to the module block 20. The fittings 16 include a groove 30 that is captured by the retaining plates 26. Accordingly, the fasteners 28 secure the retaining plates 26 to the module block 20 and in turn, the retaining plates 26 secure the fittings 16 to the module block 20. By loosening the fasteners 28, the fittings 16 may be released from the module block 20 such that new or different fittings may be mounted thereto.

In addition to the module blocks 20, at least one latch block 32 is also provided on each the fixed and mobile halves, 12 and 14. In some embodiments, each of the halves may include only a single latch block 32. For instance, see FIGS. 14-16. In other embodiments each of the halves, 12 and 14, may include two or more latch blocks 32. For instance, see FIGS. 1-2.

By way of example, the device 10 shown in FIGS. 1 and 2 includes latch blocks 32a on one of the halves, 12 and 14, that have cams 34 and the latch blocks 32b on the other one of the halves, 12 and 14, have latch pins 36. The latch blocks 32, cams 34, and latch pins 36 are the primary load bearing subassemblies of the device 10. The cams 34 transfer the torque generated by the user, operating a handle 38, into a linear force pulling and holding the two halves, 12 and 14, of the device 10 together. The latch pins 36 retain the cams 34 within the latch blocks 32 thereby enabling the two mating halves, 12 and 14, of the device 10 to be locked together.

Figure 3:
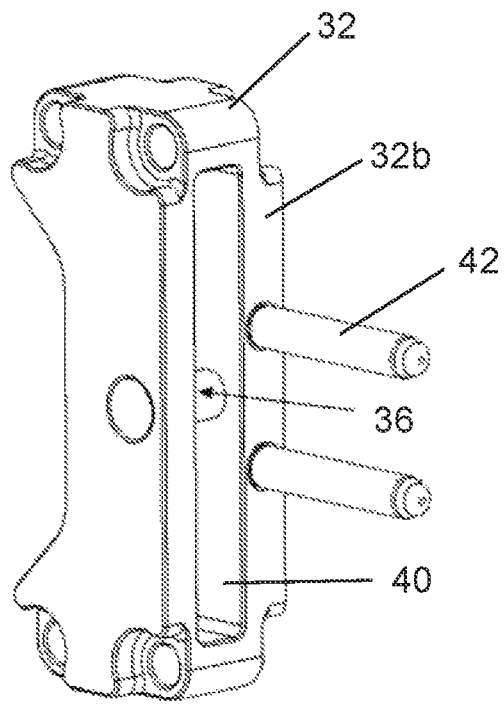
FIG. 3 is a perspective view of a mobile latch block of the mobile half of FIG. 2.
Figure 4:
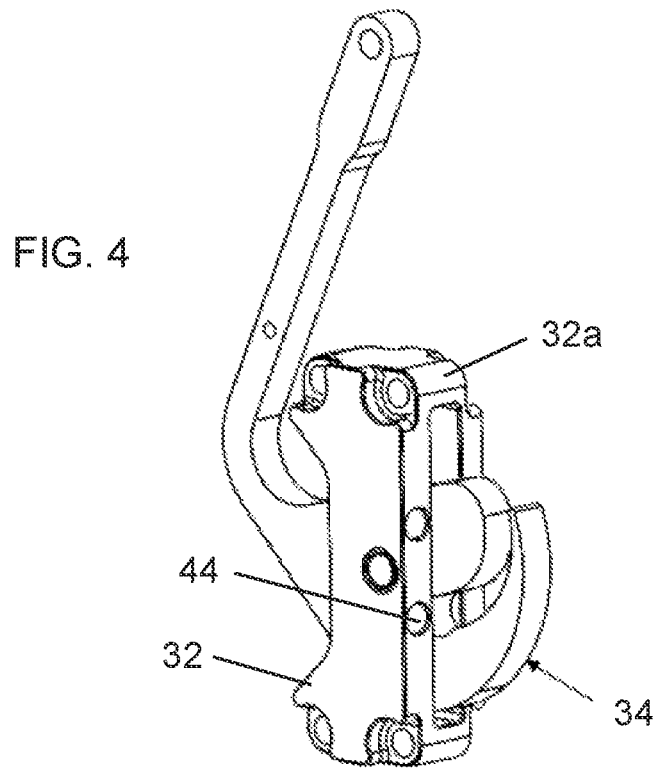
FIG. 4 is a perspective view of a fixed latch block of the fixed half of FIG. 1.

By way of example, FIG. 4 illustrates a latch block 32a in which a cam 34 is provided such that it projects outwardly from the latch block 32a and can be rotated or pivoted into an open position enabling the two halves, 12 and 14, to be brought together or separated and into a locking position in which the cam 34 engages behind the latch pin 36 of an opposed latch block 32b to lock the halves, 12 and 14, together. The latch block 32b shown in FIG. 3 has an open cavity 40 through which the latch pin 36 extends. The latch pin 36 extends laterally across the latch block 32b and parallel to the shoulder studs 22. See FIG. 2.

The halves, 12 and 14, shown in FIGS. 1 and 2 for the first embodiment include a pair of the latch blocks 32 such the latch blocks sandwich or book end the module blocks 20 on the shoulder studs 22. For example, the four module blocks 20 shown in the fixed half 12 of the device 10 in FIG. 1 are sandwiched between two latch blocks 32a having cams 34. The shoulder studs 22 extend through the module blocks 20 and the latch blocks 32a and are secured thereon by the lock nuts 24. Likewise, the four module blocks 20 shown in the mobile half 14 of the device 10 in FIG. 2 are sandwiched between two latch blocks 32b having latch pins 36. The shoulder studs 22 extend through the module blocks 20 and the latch blocks 32b and are secured thereon by the lock nuts 24. Other arrangements of module blocks 20 and latch blocks 32 are also possible.

When the cams 34 are in the open position, the mobile half 14 can be positioned adjacent the fixed half 12 and the cams 34 can be extended to the lock position to capture the latch pins 36 and pull and lock the halves, 12 and 14 together such that the sets of fittings, 16 and 18, are simultaneously connected together.

According to an embodiment, the latch blocks 32 include ether one or more alignment pins 42 or one or more apertures 44 for receiving the alignment pins 42. For example, each of the latch blocks 32b shown in FIGS. 2 and 3 include a pair of alignment pins 42 and each of the latch blocks 32a shown in FIGS. 1 and 4 include a corresponding pair of apertures 44 for the alignment pins 42. Thus, when the two halves, 12 and 14, are brought together, proper alignment is ensured by the alignment pins 42 extending within the apertures 44. Accordingly, the alignment pins 42 aid in the alignment of the two halves, 12 and 14, during the initial connection and then guide the halves, 12 and 14, together to prevent binding between fittings, 16 and 18, as the connection is completed.

Figure 13:
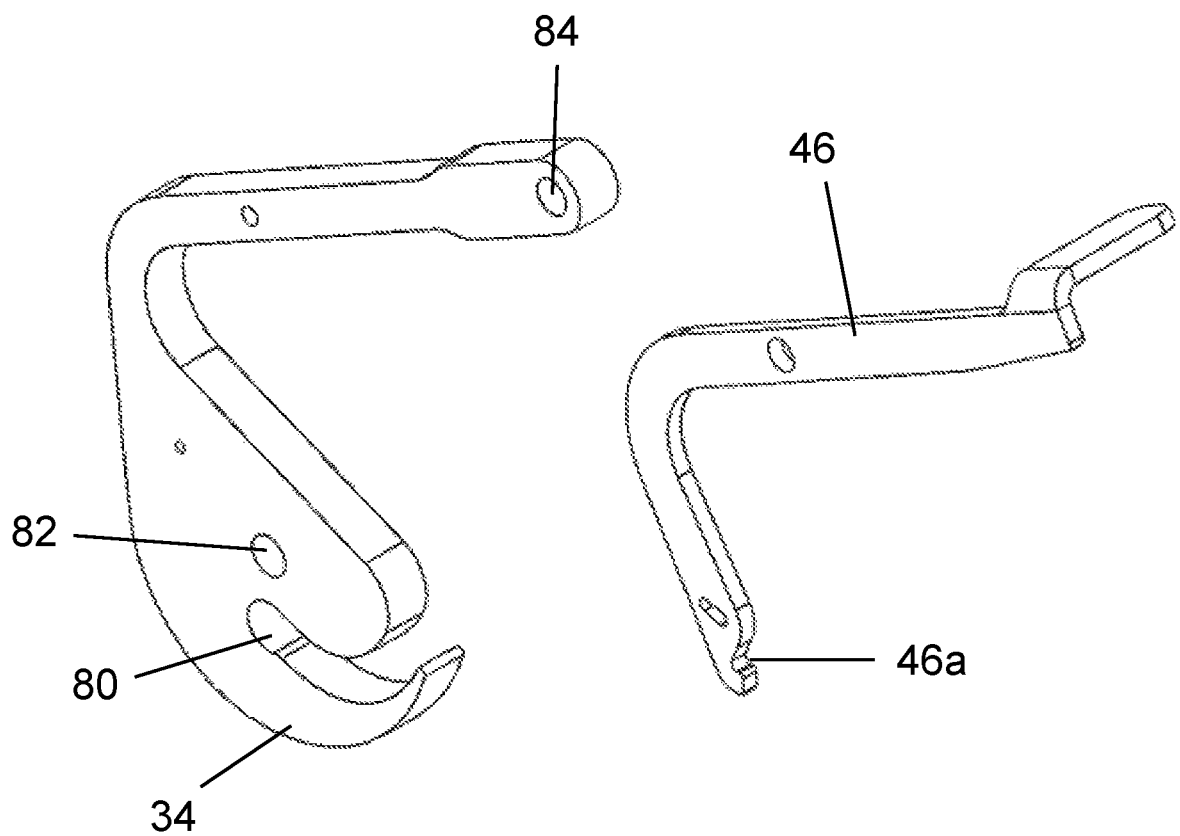
FIG. 13 is a perspective view of a disassembled cam and lock arm in accordance with an embodiment.

The cams 34 rotate or pivot about an axis 76 so that they can be pivoted between open and lock positions. In the open position, the halves, 12 and 14, can be separated or placed together, and in the lock position, the cams 34 and latch pins 36 cooperate to secure the halves, 12 and 14 together. An example of a cam 34 is shown in FIG. 13. The cam 34 includes a cam slot 80 for receiving a latch pin 36, an aperture 82 defining the axis 76 of rotation of the cam 34, and an aperture 84 to which the handle 38 may be secured. A lock arm 46 is also shown in FIG. 13. The lock arm 46 is secured or bolted to the cam 34 and is used to prevent unintentional disconnection of halves, 12 and 14, from the locked condition. The lock arm 46 has an end 46a that engages an edge or groove of the latch block 32a that prevents accidental disconnection of the cam 34 from the latch pin 36.

In the first embodiment shown in FIG. 1, the handle 38 interconnects between two cams 34. The handle serves as the user interface for operation of the device 10 and provides a means by which the user can apply force to the device 10 resulting in the connection of the two halves, 12 and 14. The modular handle 38 shown in FIG. 1 is designed such that it will work readily with the many possible configurations of the modular device 10. The modular handle 38 may include a visual indicator 48 that indicates the status of the device 10, i.e., whether or not complete connection between the two halves, 12 and 14, of the device 10 has occurred. For instance, the indicator 48 may be a color-coded component, such as a button or the like, which protrudes from the handle when the two halves, 12 and 14, are not fully connected and which is retracted into the handle when the two halves, 12 and 14, are fully connected. Further, the modular handle 38 may include handle spacers 50 that allow the handle 38 to be lengthened or shortened (i.e., retracted or extended) to enable the modular handle 38 to work readily with different configurations of the device 10 (i.e., depending on the number or size of module blocks 20 stacked together and locked on the shoulder studs 22).

The fixed half 12 as shown in FIG. 1 may also include mounting brackets 52 that permit the device 10 to be mounted onto equipment or the like. The mounting brackets 52 are such that they are able to work with many different possible configurations of the device 10 (i.e., depending on the number or size of module blocks 20 stacked together and locked together on the shoulder studs 22).

Figure 6:
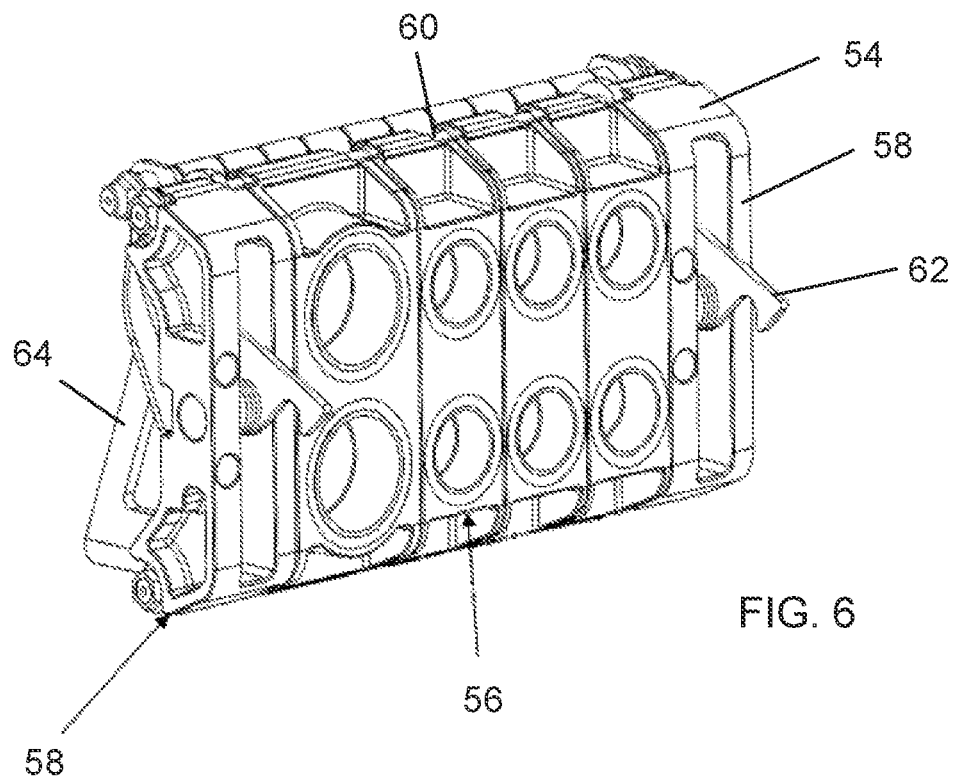
FIG. 6 is a front perspective view of a parking station module of a multi-coupling device in accordance with an embodiment.
Figure 7:
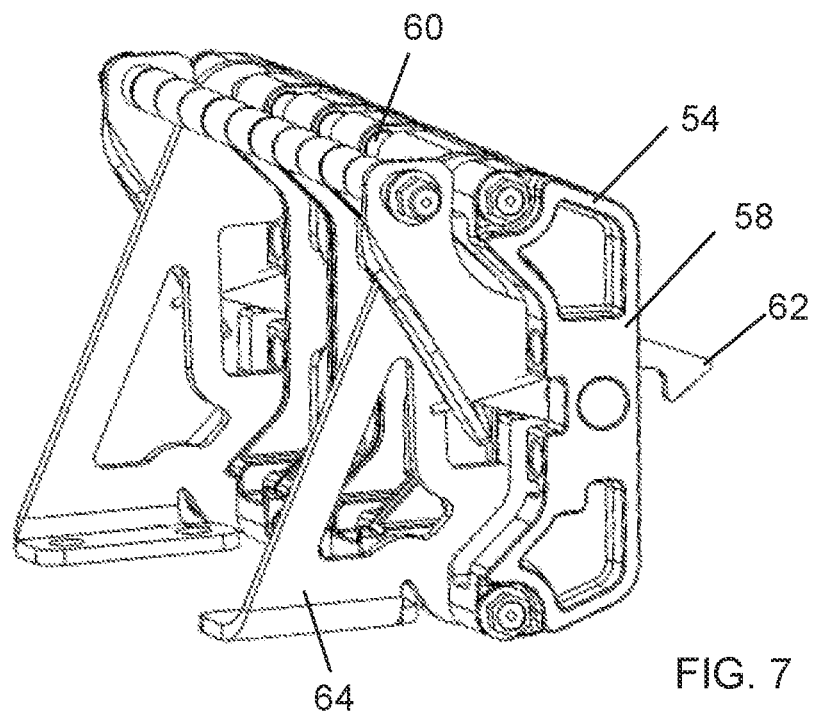
FIG. 7 is a rear perspective view of a parking station module of a multi-coupling device in accordance with an embodiment.

According to an embodiment, a modular parking station 54 as shown in FIGS. 6 and 7 may provide a holding place for the mobile half 14 of the device 10 when not connected to the fixed half 12. Use of the modular parking station 54 prevents dust, dirt, and other foreign material from entering the exposed fittings 18 of the mobile half 14. The modular parking station 54 is constructed of interchangeable modules 56 that are held between latch blocks 58 and clamped together with shoulder studs 60. The modular parking station 54 may include rotatable latches 62 that can latch onto the pins 36 of the mobile half 14 and may include a mounting bracket or stand 64.

Figure 8:
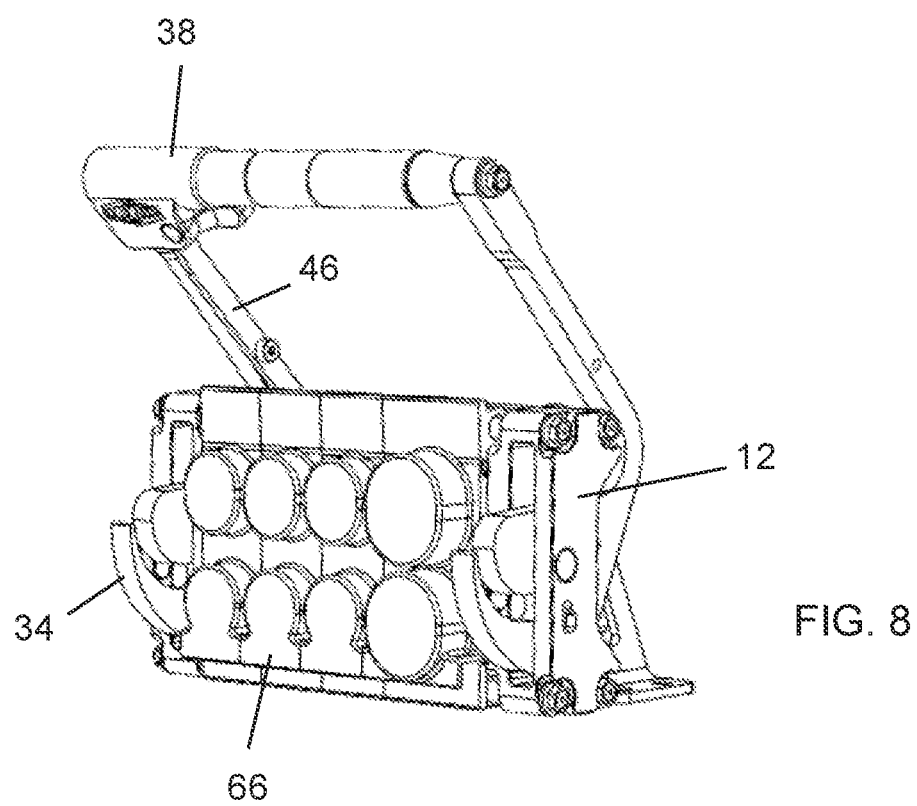
FIG. 8 is a perspective view of the fixed half of FIG. 1 with dust cap covers in a closed position in accordance with an embodiment.
Figure 9:
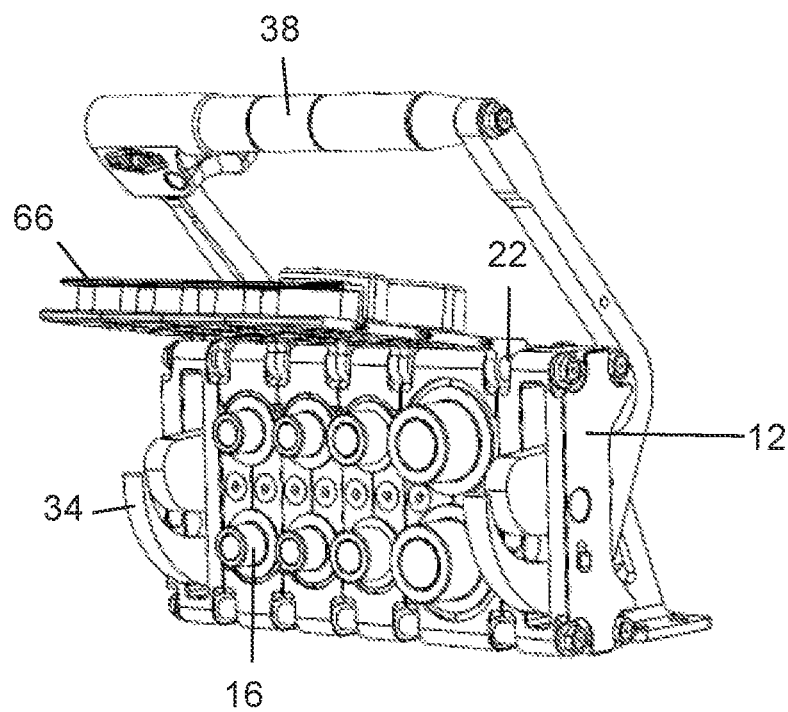
FIG. 9 is a perspective view of the fixed half of FIG. 1 with dust cap covers of FIG. 8 in an open position.
Figure 10:
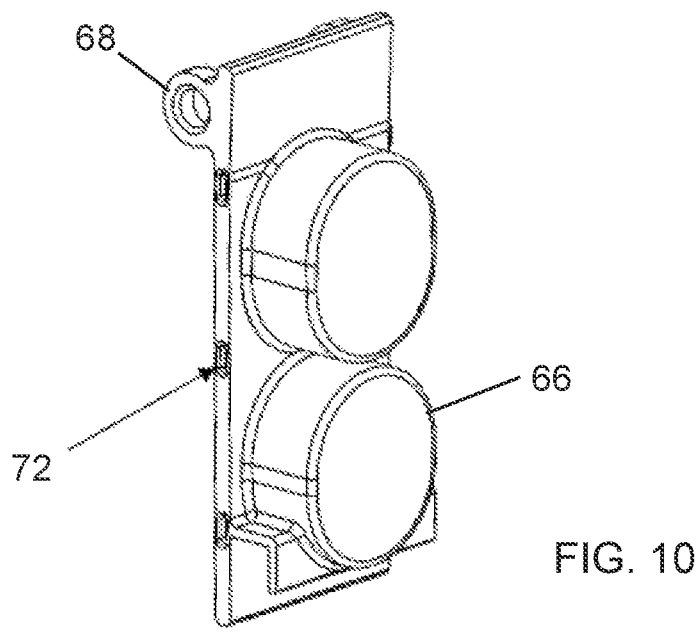
FIG. 10 is a perspective view of a dust cap module in accordance with an embodiment.
Figure 11:
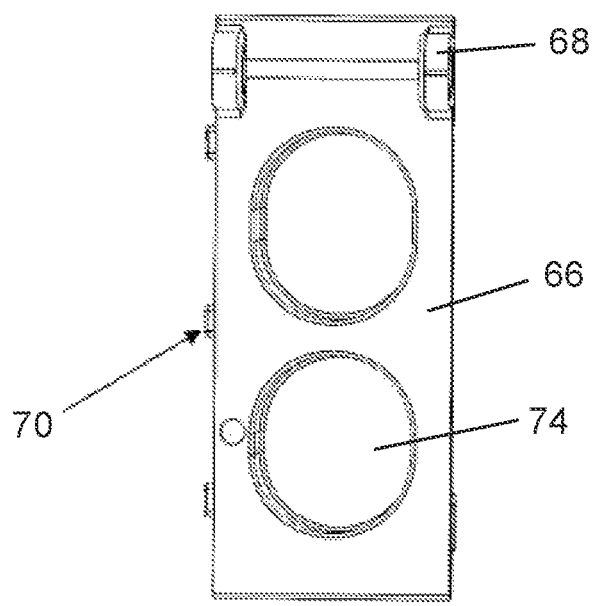
FIG. 11 is a perspective view of a rear of the dust cap module of FIG. 10.

According to an embodiment, modular dust caps such as shown in FIGS. 8-11 may be used with the fixed half 12 of the device 10 when disconnected and separated from the mobile half 14 of the device 10. The dust caps can be used to prevent dust, dirt, and other foreign material from entering the otherwise exposed fittings 16 while also being configurable to work with the many different combinations of fittings without the use of tools or custom components. For instance, as best shown in FIGS. 10 and 11, each dust cap 66 can include mounting holes 68 for use in attaching the dust cap 66 to one of the shoulder studs 22 of the fixed half 12. In addition, the dust caps 66 may include tabs 70 and slots 72 on opposite side edges such that a series of dust caps can be interconnected together with the tabs 70 mating within the slots 72 of an adjacent dust cap. For instance, see FIG. 9 in which the series of dust caps are in an upward position thereby exposing the fittings 16. In contrast, the dust caps can be rotated downward as shown in FIG. 8 in which the dust caps enclose the fittings 16. Each dust cap 66 may have one or move cavities 74 for receiving a protruding end of a fitting 16.

Accordingly, a user may select the number and size of modular blocks 20 to be provided on the fixed and mobile halves, 12 and 14, and may connect the modular blocks to at least one latch block 32. Each modular block 20 can secure one or more fittings thereto of any type or size with the use of retaining plates 26. Thereafter, the mobile half 14 may be mated with the fixed half 12 and the handle 38 may be pushed/pulled to rotate the cams 34 about the axis 76 to lock and pull the halves, 12 and 14, together thereby simultaneously connecting and quick coupling all fittings 16 to all fittings 18. The handle 38 may also be used to rotate the cams 34 to release the latch pins 36 to permit the halves, 12 and 14, to be separated.

Figure 14:
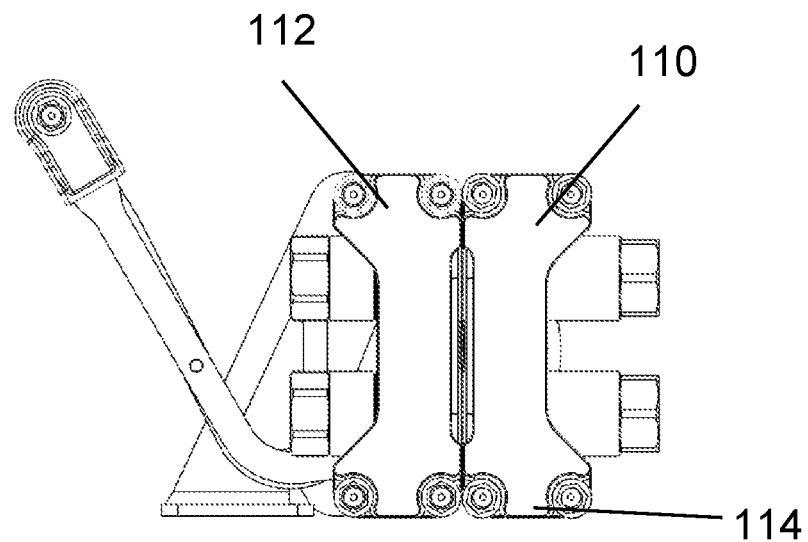
FIG. 14 is a side elevational view of a second embodiment of a multi-coupling device.
Figure 15:
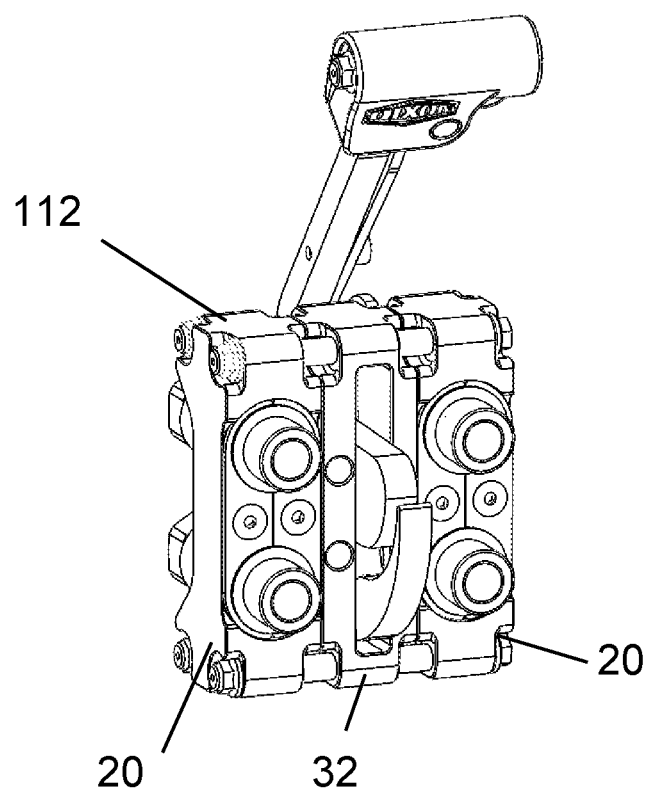
FIG. 15 is a perspective view of a fixed half of the multi-coupling device shown in FIG. 14.
Figure 16:
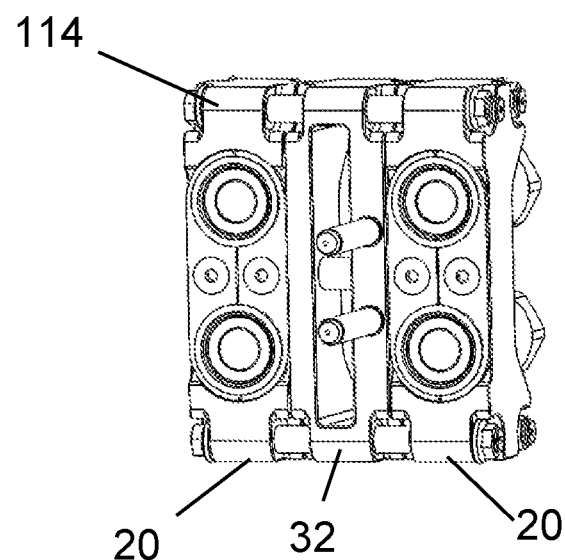
FIG. 16 is a perspective view of a mobile half of the multi-coupling device of FIG. 14.

A second embodiment of a device 110 is shown in FIGS. 14-16 and includes halves, 112 and 114. The halves, 112 and 114, are constructed of module blocks 20 and latch blocks 32 as discussed above for device 10. However, in the second embodiment, each half, 112 and 114, has only a single latch block 32. In addition, in the illustrated embodiment of device 110, the latch block 32 is centered between a pair of module blocks 20. Of course, other arrangements are possible. The device 110 and components thereof are otherwise similar to device 10 discussed above.

The foregoing description and specific embodiments are merely illustrative of the principles thereof, and various modifications and additions may be made to the apparatus by those skilled in the art, without departing from the spirit and scope of this invention.

We claim:

1. A modular multi-coupling device, comprising:
   separate first and second device halves that each carry a plurality of fittings or connectors and that are configured to be locked together or separated for purposes of simultaneously connecting or disconnecting the plurality of fittings or connectors of the first device half to or from the plurality of fittings or connectors of the second device half;
   each of the device halves is constructed of a plurality of separate module blocks secured together in side-by-side relation, each module block having at least one retaining plate for securing at least one fitting or connecter thereto; and
   each of the device halves includes at least one latch block to which the plurality of module blocks of the device half is secured;
   wherein each module block is removable and replaceable with a different module block; and
   wherein the device includes a set of interchangeable module blocks of different sizes such that the device halves can include any number and arrangement of module blocks selected from the set.

2. The modular multi-coupling device according to claim 1, wherein the at least one retaining plate of each module block is secured thereto with a fastener.

3. The modular multi-coupling device according to claim 2, wherein at least two retaining plates are secured to each module block such that the at least one fitting or connector is secured therebetween.

4. The modular multi-coupling device according to claim 3, wherein at least one fitting or connector is attached to each module block.

5. The modular multi-coupling device according to claim 1, wherein the module blocks and at least one latch block of the first device half are interconnected and secured together with at least one shoulder stud, and wherein the module blocks and at least one latch block of the second device half are interconnected and secured together with at least one shoulder stud.

6. The modular multi-coupling device according to claim 5, further comprising a separate dust cap for each of the module blocks of one of the first and second device halves, wherein each dust cap separately attaches onto one of the shoulder studs of the one of the first and second device halves.

7. The modular multi-coupling device according to claim 6, wherein each dust cap includes a side edge with at least one tab and an opposite side edge with at least one slot, and wherein adjacent dust caps connect together via the tabs and slots.

8. The modular multi-coupling device according to claim 7, wherein the dust caps are rotatable as a unit about the shoulder stud to an open position not covering the fittings or connectors and to a closed position covering the fittings and connectors.

9. The modular multi-coupling device according to claim 1, further comprising a parking station for one of the first or second device halves when separated from the over device half for covering the fittings or connectors.

10. The modular multi-coupling device according to claim 9, wherein the parking station comprises separate parking station modules and at least one latch block secured together such that each parking station module is replaceable and interchangeable.

11. The modular multi-coupling device according to claim 10, wherein the at least one latch block of the parking station includes a latch for securing one of the first or second device halves to the parking station by gripping about the latching pin of the one of the first and second device halves.

12. The modular multi-coupling device according to claim 11, wherein the parking station modules and the at least one latch block of the parking station are secured together on at least one shoulder stud of the parking station.

13. The modular multi-coupling device according to claim 1, wherein one of the first and second device halves includes a mounting bracket.

14. A modular multi-coupling device, comprising:
separate first and second device halves that each carry a plurality of fittings or connectors and that are configured to be locked together or separated for purposes of simultaneously connecting or disconnecting the plurality of fittings or connectors of the first device half to or from the plurality of fittings or connectors of the second device half;

each of the device halves is constructed of a plurality of separate module blocks secured together in side-by-side relation, each module block having at least one retaining plate for securing at least one fitting or connecter thereto; and each of the device halves includes at least one latch block to which the plurality of module blocks of the device half is secured;

wherein the at least one latch block of the first device half has a cam, wherein the at least one latch block of the second device half has a latch pin, and wherein the cam is configured to pivot between open and lock positions such that in the lock position the cam captures the latch pin and forces the first and second device halves together to connect the fittings or connectors of the first device half with the fittings or connectors of the second device half.

15. The modular multi-coupling device according to claim 14, wherein the latch block of one of the first and second device halves includes at least one alignment pin, wherein the latch block of the other of the first and second device halves includes at least one aperture for receiving the at least one alignment pin such that the at least one alignment pin inserted in the at least one aperture aids in alignment of the first and second device halves and guides the first and second device halves together when the cam is moved to the lock position.

16. The modular multi-coupling device according to claim 14, wherein a handle is connected to the cam.

17. The modular multi-coupling device according to claim 16, wherein the handle has a length that is adjustable.

18. The modular multi-coupling device according to claim 16, wherein the handle includes a visual indicator that indicates and distinguishes when the first and second device halves are in a connected condition and when the first and second device halves are not in a connected condition.

* * * * *